(12) United States Patent
Boldt et al.

(10) Patent No.: US 8,769,223 B2
(45) Date of Patent: Jul. 1, 2014

(54) SYSTEM AND METHOD FOR SETTING AN ACTIVATION STATE FOR A DEVICE USED IN A BACKUP OPERATION

(75) Inventors: Michael W. Boldt, Eagan, MN (US); Samuel J. Pierson, Coon Rapids, MN (US); Erica B. Antony, Blaine, MN (US); Aaron C. Christensen, St. Paul Park, MN (US)

(73) Assignee: Symantec Corporation, Mountain View, CA (US)

( * ) Notice: Subject to any disclaimer, the term of this patent is extended or adjusted under 35 U.S.C. 154(b) by 896 days.

(21) Appl. No.: 12/059,099

(22) Filed: Mar. 31, 2008

(65) Prior Publication Data

US 2009/0249006 A1  Oct. 1, 2009

(51) Int. Cl.
*G06F 12/02* (2006.01)

(52) U.S. Cl.
USPC .................................. 711/162; 711/E12.002

(58) Field of Classification Search
None
See application file for complete search history.

(56) References Cited

U.S. PATENT DOCUMENTS

| | | | | |
|---|---|---|---|---|
| 5,966,730 | A * | 10/1999 | Zulch | 711/162 |
| 7,096,333 | B2 * | 8/2006 | McBrearty et al. | 711/163 |
| 7,631,220 | B1 | 12/2009 | Hamilton | |
| 7,680,998 | B1 * | 3/2010 | Auchmoody et al. | 711/162 |
| 7,685,189 | B2 | 3/2010 | Mittal | |
| 7,685,227 | B2 | 3/2010 | Gerber | |
| 7,693,885 | B2 | 4/2010 | Okada | |
| 7,702,824 | B2 | 4/2010 | Rossi | |
| 2003/0126247 | A1 * | 7/2003 | Strasser et al. | 709/223 |
| 2006/0253731 | A1 * | 11/2006 | Petruzzo | 714/6 |
| 2007/0136541 | A1 * | 6/2007 | Herz et al. | 711/162 |
| 2008/0104146 | A1 * | 5/2008 | Schwaab et al. | 707/204 |
| 2008/0307175 | A1 * | 12/2008 | Hart et al. | 711/162 |

OTHER PUBLICATIONS

"BrightStor ARCserve Backup for Windows Administrator Guide," Computer Associates, Inc., 2004.
"Legato NetWorker Administrator's Guide UNIX Version," Legato Systems Inc., 1998.
"CommVault Simpana Backup and Recovery for Enterprise Deployments," CommVault Systems Inc., Copyright 1999-2009.

* cited by examiner

*Primary Examiner* — Charles Rones
*Assistant Examiner* — Ryan Dare
(74) *Attorney, Agent, or Firm* — Meyertons Hood Kivlin Kowert & Goetzel, PC

(57) ABSTRACT

Various embodiments of a system and method for performing a backup operation are disclosed. Backup operation information may be stored, where the backup operation information specifies a backup operation to be performed using at least a first device. Subsequent to storing the backup operation information, state information for the first device may be stored, where the state information indicates whether the first device is eligible for use in backup operations. Before the backup operation is performed, the state information for the first device may be accessed. If the state information for the first device indicates that the first device is eligible for use in backup operations then the backup operation may be performed using the first device (as well as possibly other devices). If the state information for the first device indicates that the first device is ineligible for use in backup operations then the backup operation may be prevented from using the first device.

20 Claims, 4 Drawing Sheets

SYSTEM AND METHOD FOR SETTING AN ACTIVATION STATE FOR A DEVICE USED IN A BACKUP OPERATION

BACKGROUND OF THE INVENTION

1. Field of the Invention

This invention relates to distributed computer systems. More particularly, the invention relates to a system operable to automatically backup data from a plurality of client computer systems onto one or more storage devices.

2. Description of the Related Art

Computer systems generally store various types of information, e.g., where the data is stored in files or databases. If a storage device on which the data is stored fails then the data may be lost. Thus, it is often desirable to backup the data stored on a computer system.

Computer systems for large enterprises can include many client computer systems that need to be backed up. Some enterprises use specialized backup servers or backup software which allows administrators to configure backup operations to be automatically run at scheduled times. For example, the administrator may create a backup operation by specifying which client computer systems are to be backed up, the storage device(s) to which the data should be backed up, time and date information indicating when to perform the backup operation, etc.

SUMMARY

According to one embodiment of a system and method described herein, backup operation information may be stored, where the backup operation information specifies a backup operation to be performed using at least a first device. Subsequent to storing the backup operation information, state information for the first device may be stored, where the state information indicates whether the first device is eligible for use in backup operations. Before the backup operation is performed, the state information for the first device may be accessed to determine whether the first device is eligible for use in backup operations. If the state information for the first device indicates that the first device is eligible for use in backup operations then the backup operation may be performed using the first device (as well as possibly other devices). If the state information for the first device indicates that the first device is ineligible for use in backup operations then the backup operation may be prevented from using the first device. For example, in some embodiments the first device may be a first client computer. The first backup operation may be configured to backup the first client computer. In this example, preventing the first backup operation from using the first device may comprise preventing the first backup operation from backing up the first client computer. As another example, in some embodiments the first device may be a first storage device, and the first backup operation may be configured to backup data to the first storage device. In this example, preventing the first backup operation from using the first device may comprise preventing the first backup operation from backing up the data to the first storage device.

BRIEF DESCRIPTION OF THE DRAWINGS

A better understanding of the invention can be obtained when the following detailed description is considered in conjunction with the following drawings, in which.

Figure 1:
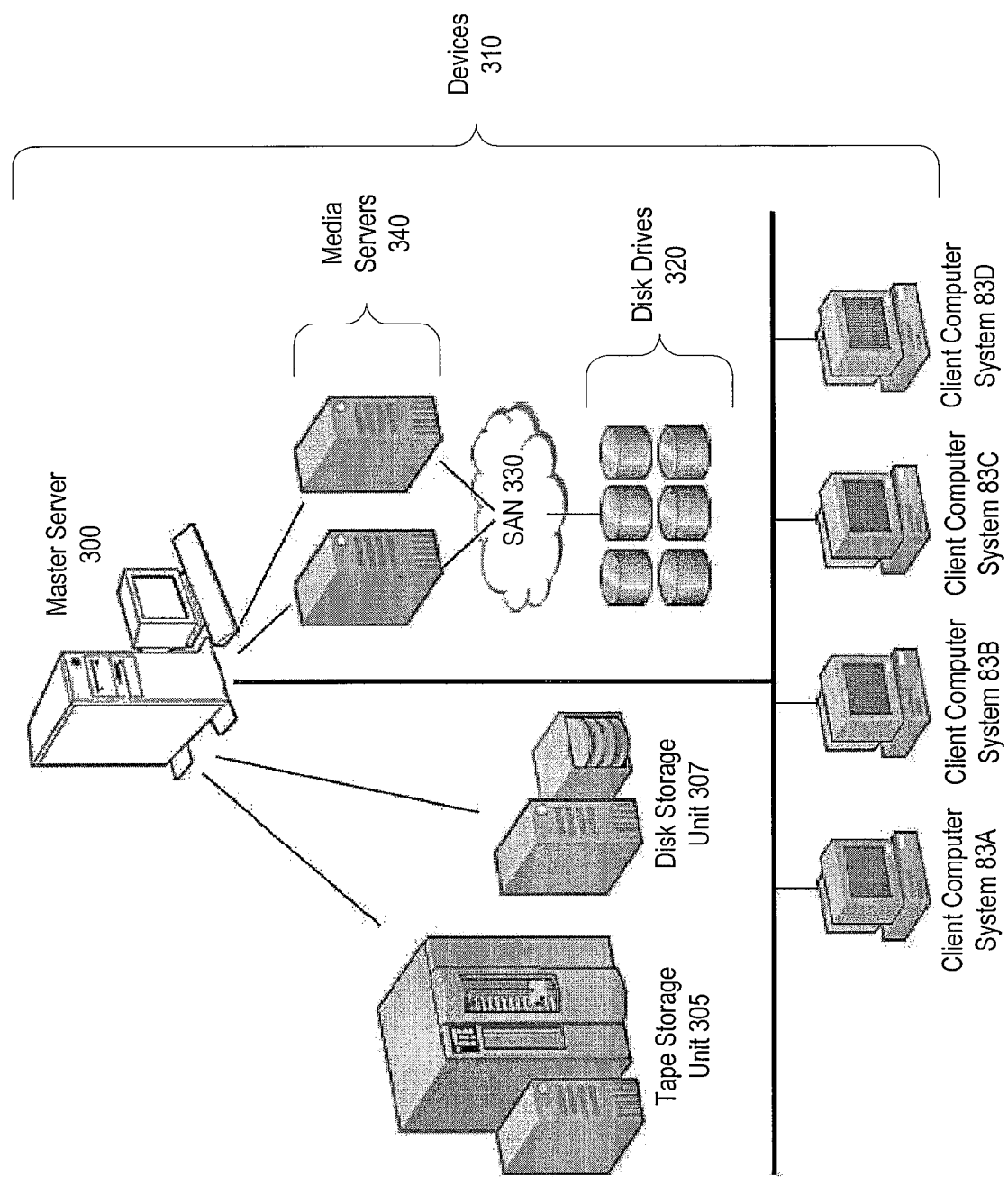
FIG. 1 illustrates a system including a plurality of devices which are used in performing a plurality of backup operations.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1 illustrates a system including a plurality of devices 310 which are used in performing a plurality of backup operations. The devices 310 include a plurality of client computer systems 83. The devices 310 also include one or more storage devices. As used herein, the term "storage device" refers to a device operable to store data. In various embodiments the devices 310 may include any of various kinds of storage devices. Examples of storage devices illustrated in FIG. 1 include a tape storage unit 305 (e.g., a storage device operable to store data on a plurality of tape cartridges), a disk storage unit 307 (e.g., a storage device operable to store data on a plurality of hard disks), and a plurality of disk drives 320. In this example, the disk drives 320 are coupled through a Storage Area Network (SAN) 330 to one or more media servers 340.

The system also includes one or more master servers 300. The master server(s) 300 may be configured to manage operation of the backup operations. Each backup operation may be configured to backup data from one or more of the client computer systems 83 onto one or more of the storage devices in the system. For example, the master server 300 may execute server-side backup software which communicates with client-side backup software on the client computers 83 to cause data to be backed up from the client computers 83 to the storage devices. In some embodiments intermediate servers, e.g., the media servers 340, may also be used in performing the backup operations. For example, a particular backup operation may be configured to transmit backup data to a media server 340 in order to cause the media server 340 to store the backup data on a disk drive 320 or other storage device coupled to the media server 340.

In some embodiments the master server 300 may store a backup operations database 400 which stores information regarding the backup operations that are performed by the system. Each backup operation may be defined by backup policy information stored in the backup operations database 400. For example, for each backup operation to be performed by the system, an administrator may interact with the graphical user interface provided by the server-side backup software in order to create a respective backup policy. For example, the backup policy may specify which client computer systems 83 are to be backed up, the storage device(s) to which the data should be backed up, time and date information indicating when to perform the backup operation, etc.

In some embodiments the master server 300 may also store a device state database 403 which stores state information for various devices 310 in the system. The state information for each device 310 may indicate whether the device 310 is eligible for use in the backup operations. For example, in some embodiments the state information for each device 310 may indicate that the device 310 is either in an active state or in an inactive state. If the state information for a device 310 indicates that the device 310 is in an active state then any backup operations that are configured to use the device 310 may be allowed to use the device 310 when they are performed. If, on the other hand, the state information for a device 310 indicates that the device 310 is in an inactive state then any backup operations that are configured to use the device 310 may be prevented from using the device 310. Thus, the state information for each device 310 may indicate whether the device 310 is online and ready/allowed to be used in backup operations.

The server-side backup software may enable an administrator of the system to control the respective activation states of the devices 310, e.g., through an administrative tool 429. For example, suppose that the administrator knows that a particular group of client computer systems 83 are not currently in operation. For example, the client computer systems 83 may be powered down or may be offline for maintenance. The administrator may use the administrative tool 429 to specify that the client computer systems 83 in the group are currently not eligible for use in backup operations, e.g., by setting the activation states of the client computer systems 83 in the group to inactive. (It is noted that setting the activation state for a given device 310 may not affect the device 310 itself or cause the device 310 to be accessed, but instead simply changes the state information stored in the device state database 403 for the device 310.) When the maintenance for the client computer systems 83 in the group has been completed and the client computer systems 83 are back online, the administrator may use the administrative tool 429 again to set the activation states of the client computer systems 83 in the group back to the active state in order to indicate that they are once again eligible for use in backup operations.

Backup operations may be prevented from using any of the client computer systems 83 in the group for the duration of the time that their activation states are set to inactive. For example, when a particular backup operation is scheduled to run, the master server 300 may first check the device state database 403 to determine the activation states of the client computer systems 83 configured to be backed up by the particular backup operation, e.g., in order to determine whether these client computer systems 83 are currently eligible for use in backup operations. Only the client computer systems 83 indicated as being in an active state may be backed up by the backup operation. Any client computer systems 83 indicated as being in an inactive state may not be backed up when the backup operation is performed. In some embodiments, if, at the time the backup operation is scheduled to run, none of the client computer systems 83 which the backup operation is configured to backup are currently eligible for use in backup operations then the backup operation may not be run.

The administrative tool 429 may also enable the administrator to set the activation states of the storage devices used in the backup operations. For example, suppose that the administrator knows that a particular storage device is not currently in operation, e.g., because it is down for maintenance. The administrator may use the administrative tool 429 to set the activation state of the storage device to inactive. (As noted above, setting the activation state of the storage device simply changes the state information for the storage device. Setting the activation state of the storage device does not affect the storage device itself or cause the storage device to be accessed.) When the maintenance for the storage device has been completed and the storage device is back online, the administrator may use the administrative tool 429 again to set the activation state of the storage device back to the active state.

Backup operations may be prevented from using storage devices while their activation states are set to inactive. For example, suppose that a particular backup operation is configured to backup data to a particular storage device. When the backup operation is scheduled to run, the master server 300 may first check the device state database 403 to determine the state of the storage device configured to be used by the backup operation. If the storage device is currently indicated as being inactive then the backup operation may not be run. In other embodiments, the policy information for the backup operation may specify that any storage device from a particular group of storage devices may be used for the backup operation. Thus, the master server 300 may determine which storage devices in the group are currently active and may select one of the active storage devices to be used for the backup operation. In other embodiments, the policy information for the backup operation may specify that data should be backed up onto each storage device of a group of storage devices. Thus, when the backup operation is performed, the data may be backed up onto each storage device of the group that is currently active, but may not be backed up to any storage devices that are currently inactive.

In some embodiments the server-side backup software may be configured to log or report errors that occur during backup operations. For example, if a backup operation attempts to backup data from a particular client computer system 83 and fails because the client computer system 83 is currently inaccessible or not in operation then the server-side backup software may log or report an error. Similarly, if a backup operation attempts to backup data to a particular storage device and fails because the storage device is currently inaccessible or not in operation then the server-side backup software may log or report an error. Thus, administrators may use the administrative tool 429 to set the activation states of particular devices 310 to inactive when they know that the particular devices 310 are out of operation in order to prevent errors from being reported by backup operations which use these particular devices 310. This may ease the administrative burden of evaluating reported errors, particularly for a large enterprise system that includes many devices 310.

In some embodiments if a backup operation attempts to use a particular device 310 and fails then the server-side backup software may log an error indicating the failure and then set the activation state for the device 310 to inactive. This may allow the failure to be brought to the administrator's attention, but may prevent the same error from being reported multiple times, e.g., since backup operations will no longer attempt to use the particular device 310 until it returns to an active state.

Figure 2:
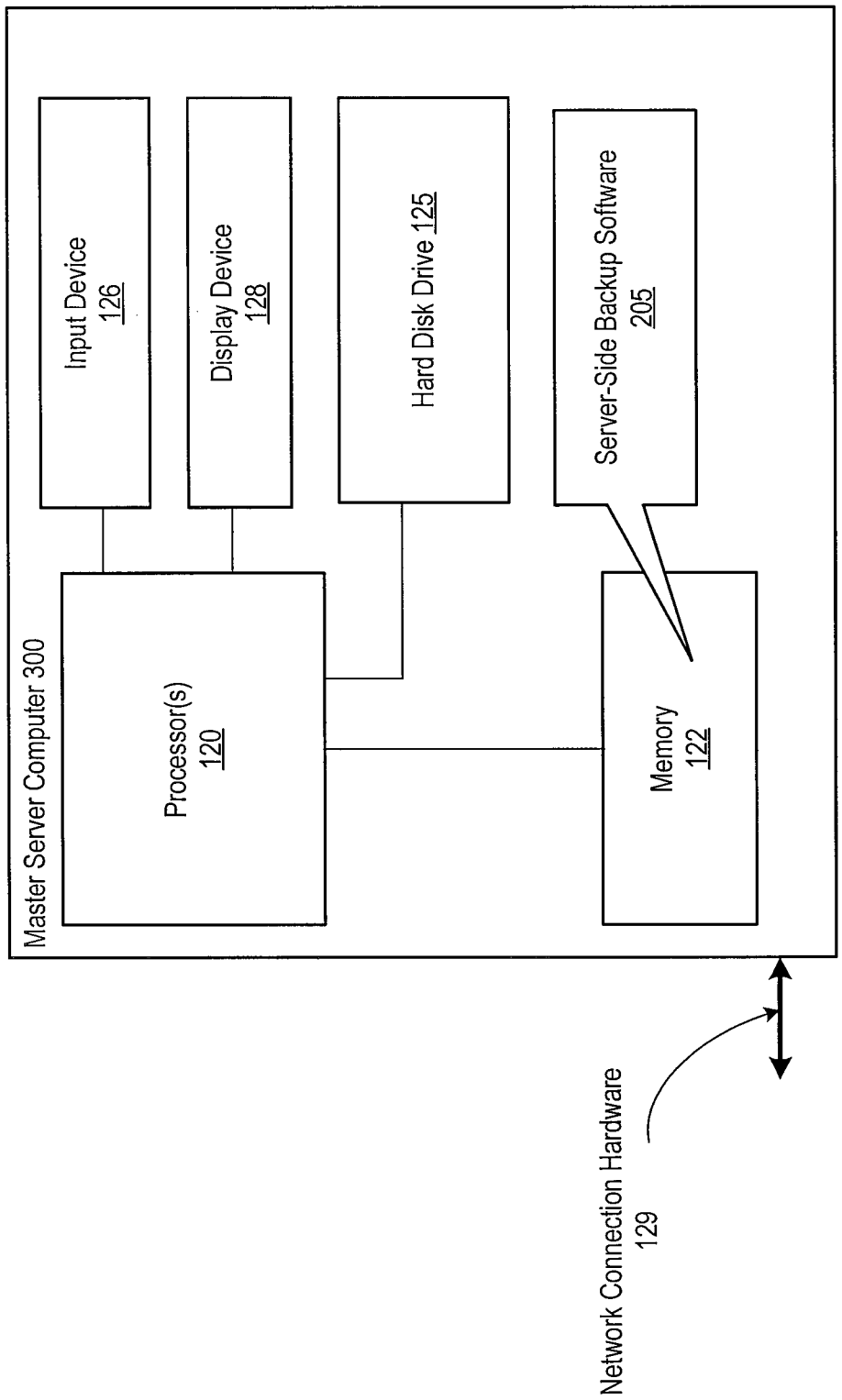
FIG. 2 illustrates an example of a master server used in performing the backup operations.

Referring now to FIG. 2, an example embodiment of the master server 300 is illustrated. In this example, the master server 300 includes a processor 120 coupled to memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may be configured to store program instructions and/or data. In particular, the memory 122 may store the server-side backup software 205. The processor 120 may execute the server-side backup software 205 to perform the functions described herein. The memory 122 may also store other software which operates in conjunction with or which is used by the server-side backup software 205, such as operating system software, file system software, network communication software, etc.

In various embodiments the server-side backup software 205 may be implemented in any of various ways and may have any desired software architecture. In some embodiments the server-side backup software 205 may include multiple components such as described below with reference to FIG. 3. Also, in some embodiments the server-side backup software 205 may be distributed across multiple server computers.

Referring again to FIG. 2, it is noted that the processor 120 is representative of any type of processor. For example, in some embodiments, the processor 120 may be compatible with the x86 architecture, while in other embodiments the processor 120 may be compatible with the SPARC™ family of processors. Also, in some embodiments the computer 83 may include multiple processors 120.

The master server 300 may also include one or more hard disk drives 125 or other storage devices. The master server 300 may also include one or more input devices 126 for receiving user input, e.g., from an administrator of the system. The input device(s) 126 may include any of various types of input devices, such as keyboards, keypads, microphones, or pointing devices (e.g., a mouse or trackball). The master server 300 may also include one or more output devices 128 for displaying output to the administrator. The output device (s) 128 may include any of various types of output devices or display devices, such as LCD screens or monitors, CRT monitors, etc.

The master server 300 may also include network connection hardware 129 through which the master server 300 connects to a network, e.g., in order to communicate with other devices 310 in the system. The network connection hardware 129 may include any type of hardware for coupling the master server 300 to the network, e.g., depending on the type of network. In various embodiments, the master server 300 may connect to the other devices 310 through any type of network or combination of networks. For example, the network may include any type or combination of local area network (LAN), a wide area network (WAN), wireless networks, an Intranet, the Internet, etc. Exemplary local area networks include Ethernet networks, Fiber Distributed Data Interface (FDDI) networks, and token ring networks. Also, the computer 83 and the server computer system 90 may each be coupled to the network using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11 (wireless Ethernet), a modem link through a cellular service, a satellite link, etc.

Figure 3:
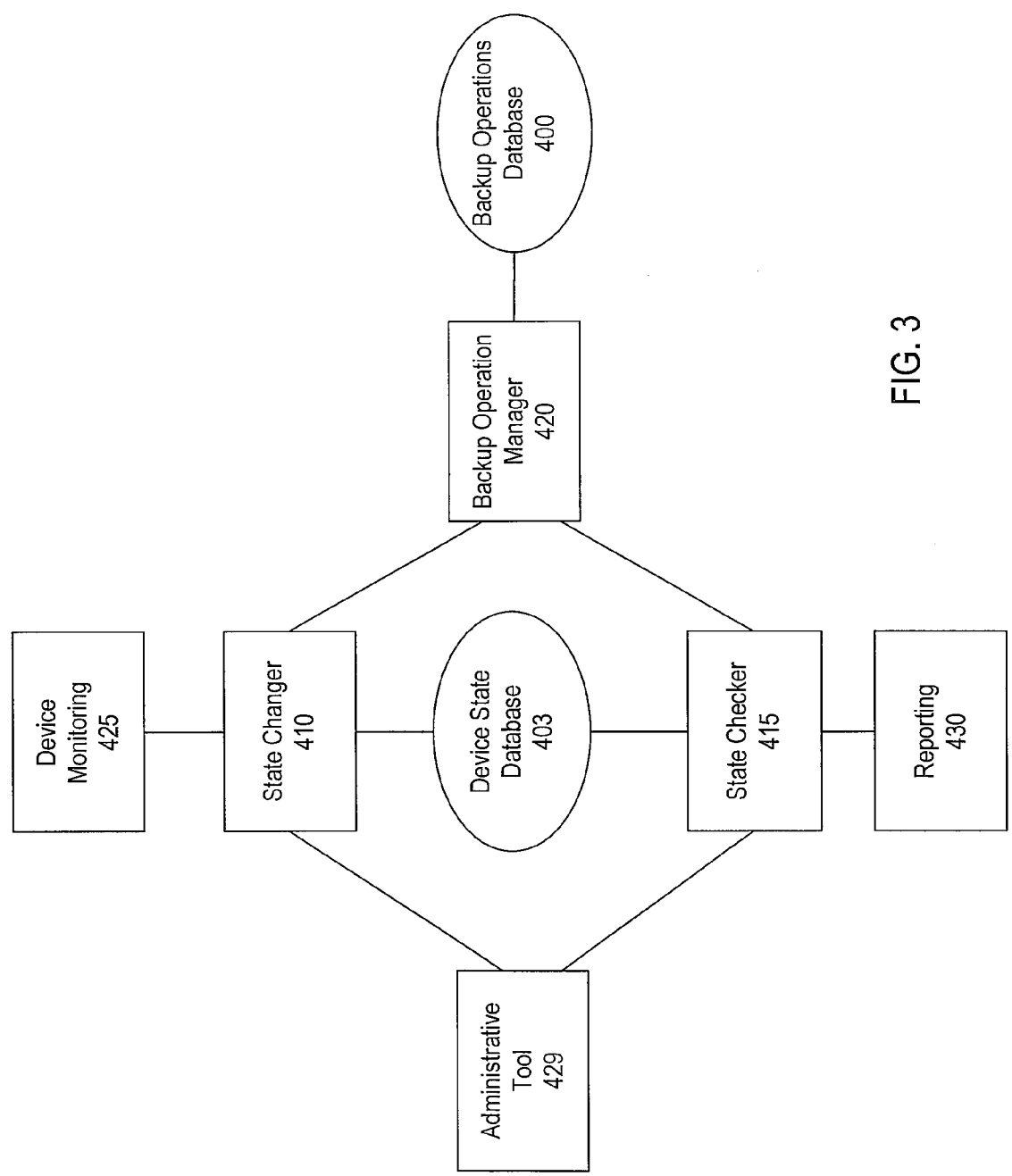
FIG. 3 illustrates various components that may be implemented by server-side backup software executed by the master server.

FIG. 3 illustrates various components that may be implemented by the server-side backup software 205 according to one embodiment. In the illustrated embodiment the server-side backup software 205 includes a backup operation manager 420 which manages the performance of the backup operations configured for the system. The backup operations database 400 may include policy information defining each backup operation.

The server-side backup software 205 may also maintain a device state database 403 which stores state information for various devices 310 in the system. For example, the device state database 403 may be stored on the hard disk drive 125 of the master server 300 or on any other storage device accessible by the master server 300. When a backup operation is scheduled to run, the backup operation manager 420 may communicate with a state checker component 415 in order to determine the current activation states of the devices 310 configured to be used in the backup operation.

The server-side backup software 205 also includes a state changer component 410. The state changer component 410 is operable to set or change the activation states of the devices 310 in the system by updating the state information stored in the device state database 403. For example, in some embodiments the administrative tool 429 may communicate with the state changer component 410 to request the activation states of various devices 310 to be changed. For example, in some embodiments the administrative tool 429 may execute to display a graphical user interface which indicates the devices 310 present in the system. The administrator may interact with the graphical user interface to select a desired device 310 or group of devices 310 to activate or deactivate.

Also, in some embodiments, instead of immediately activating or deactivating a device 310 or group of devices 310, the graphical user interface of the administrative tool 429 may allow the administrator to specify a future time for the device (s) 310 to be automatically activated or deactivated. For example, suppose that the administrator knows that a particular device 310 will be taken down for maintenance on a particular date at a particular time. The administrator may schedule the state changer component 410 to automatically deactivate the particular device 310 at that date and time. In some embodiments the administrator may also schedule the state changer component 410 to automatically reactivate the particular device 310 at a later date and time, e.g., so that the particular device 310 is automatically reactivated when the maintenance period is over.

In other embodiments the administrator may not need to specify the date and time for the device 310 to the reactivated. Instead, a device monitoring component 425 may be operable to monitor the device 310 and automatically set its activation state back to active when the device 310 is back online. For example, in some embodiments the device monitoring component 425 may detect a network event indicating that the device 310 has reconnected to the network, where it was previously not connected to the network. Thus, in response to the device 310 reconnecting to the network, the device monitoring component 425 may request the state changer component 410 to set the activation state of the device 310 back to active.

As another example, in some embodiments the device monitoring component 425 may be operable to automatically request the state changer component 410 to set the activation state of the device 310 back to active if it detects that the device 310 has left an error state. For example, in some embodiments the server-side backup software 205 may detect that the device 310 is in an error state when it attempts to use the device 310 during a backup operation. In response, the server-side backup software 205 may request the state changer component 410 to change the activation state information for the device 310 to inactive. The device monitoring component 425 may be operable to monitor the device 310 and detect when the problem with the device 310 has been corrected, e.g., detect when the device 310 leaves the error state. In response, the device monitoring component 425 may request the state changer component 410 to change the activation state of the device 310 back to the active state so that the device 310 can once again be used in backup operations.

In other embodiments, the device monitoring component 425 or other components of the server-side backup software 205 may be operable to monitor for and detect any of various other kinds of events and automatically change the activation states of devices 310 in the system in response to the events. As an example, suppose that a particular device 310 is currently in an inactive state, as indicated by the state information for the particular device 310 in the device state database 403. For example, an administrator may have manually set the activation state of the device 310 to inactive, or the server-side backup software 205 may have automatically set the activation state of the device 310 to inactive, e.g., in response to an error reported by a backup operation when attempting to use the device 310. In some embodiments the server-side backup software 205 may be operable to display a graphical user interface that allows the administrator to select the device 310 and interactively request the server-side backup software 205 to attempt to use the device 310 in a backup operation (even though the device 310 is currently in the inactive state). If the backup operation is successful in using the device 310 then the server-side backup software 205 may automatically change the activation state information for the device 310 back to the active state. Changing the activation state of the device 310 back to active indicates that the device 310 is ready and capable to be used in backups (as indicated by the fact that the backup operation successfully used the device 310 when requested to do so by the administrator).

As illustrated in FIG. 3, the server-side backup software 205 may also include a reporting component 430. The reporting component 430 may be operable to query the state checker component 415 or the device state database 403 in order to generate various types of reports based on the state information stored in the device state database 403. For example, in some embodiments the device state database 403 may not only store the current activation state of each device 310, but may also store history information indicating past activation states for the devices 310. For example, the state information for each device 310 may indicate each time that the device 310 has been activated and deactivated. Thus, the reporting component 430 may be operable to generate a report indicating how often or when the various devices 310 in the system have been deactivated. This information may be useful, for example, to enable the administrator to determine the most problematic devices 310 in the system, e.g., the devices which are deactivated the most often or for the longest periods of time.

Figure 4:
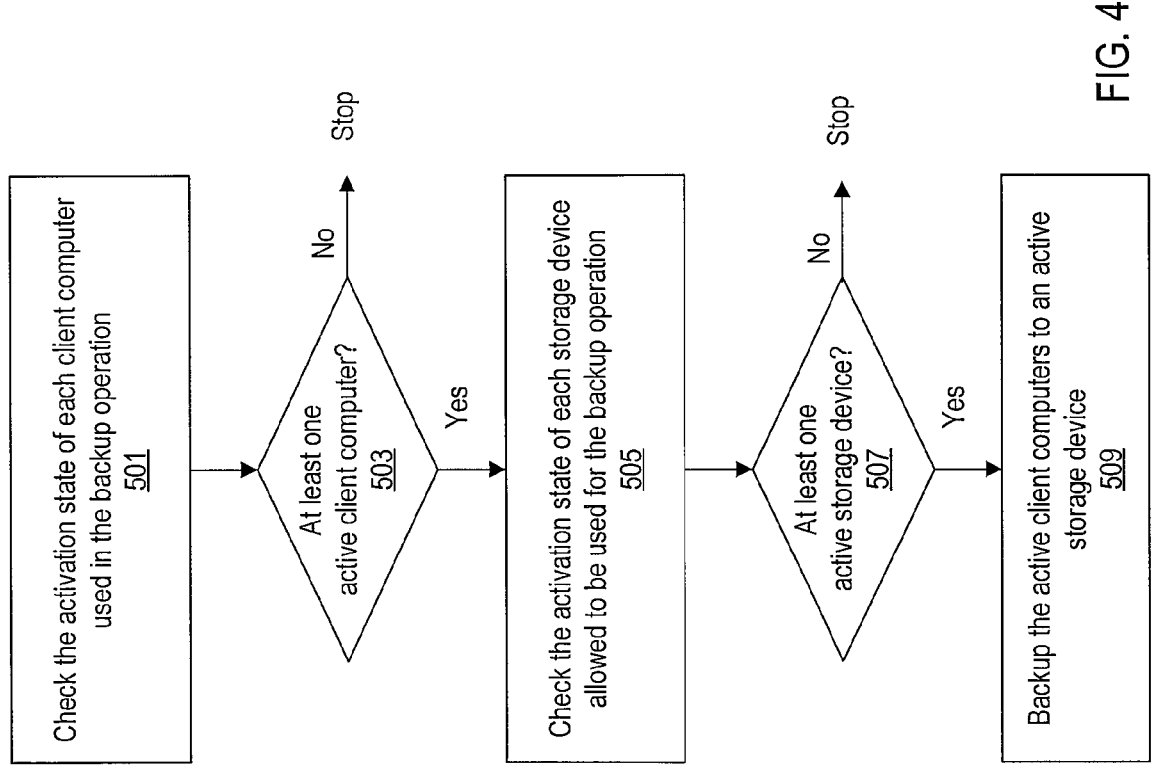
FIG. 4 is a flowchart diagram illustrating one embodiment of a method for performing a backup operation.

FIG. 4 is a flowchart diagram illustrating one embodiment of a method for performing a backup operation. The method may be implemented by the server-side backup software 205. When the backup operation is scheduled to run, the server-side backup software 205 may determine whether each client computer system 83 which the backup operation is configured to backup is currently eligible for use in backup operations. For example, as indicated in block 501, the server-side backup software 205 may check the current activation state of each client computer system 83 to be backed up by the backup operation. The current activation state of each respective client computer system 83 is determined by checking the activation state information stored in the device state database 403 for the respective client computer system 83. Thus, checking the current activation state of each client computer system 83 may not require accessing the client computer system 83 itself, e.g., since the device state database 403 may be stored separately from the client computer systems 83. If there is not at least one active client computer system 83 then the backup operation may not run, as indicated in block 503.

In some embodiments the policy information for the backup operation may indicate that the backup data for the backup operation may be stored on any storage device selected from a particular group of storage devices. If it is determined in block 503 that at least one of the client computer systems 83 specified for the backup operation is currently eligible to be used in the backup operation then the server-side backup software 205 may determine whether the storage devices in the group of storage devices configured for the backup operation are currently eligible to be used in the backup operation. For example, as indicated in block 505, the server-side backup software 205 may check the current activation states of the storage devices in the group of storage devices configured for the backup operation. The current activation state of each respective storage device is determined by checking the activation state information stored in the device state database 403 for the respective storage device. Thus, checking the current activation state of each storage device may not require accessing the storage device itself, e.g., since the device state database 403 may be stored separately from the storage devices.

If none of the storage devices in the group is currently active then the backup operation may not be run, as indicated in block 507. Otherwise, the server-side backup software 205 may perform the backup operation by backing up the currently active client computer systems 83 to one or more of the currently active storage devices, as indicated in block 509. If any of the client computer systems 83 or storage devices are currently inactive, these devices may not be used or accessed in the backup operation.

It is noted that various embodiments may further include receiving, sending or storing instructions and/or data implemented in accordance with the foregoing description upon a computer-accessible storage medium. Generally speaking, a computer-accessible storage medium may include any storage media accessible by a computer during use to provide instructions and/or data to the computer. For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A tangible, non-transitory computer-accessible storage medium storing program instructions executable to:
   store backup operation information specifying a backup operation to be performed in a backup system, wherein the backup operation is configured to use a first target backup device for storing data backed up from client computers;
   subsequent to storing the backup operation information, receive user input scheduling a future time for the first target backup device to become ineligible for use in backup operations;
   at the scheduled time and in response to the user input, set state information for the first target backup device to indicate that the first target backup device is ineligible for use in backup operations;

at a first time after the scheduled time and before performing the backup operation, access the state information for the first target backup device to determine whether the first target backup device is eligible for use in backup operations;

in response to determining that the state information for the first target backup device indicates that the first target backup device is ineligible for use in backup operations, perform the backup operation by backing up one or more client computers to another target backup device instead of the first target backup device without logging an error reporting that the first target backup device was ineligible for use in the backup operation; and at a second time after the scheduled time and after performing the backup operation, automatically change the state information for the first target backup device to indicate that the first target backup device is eligible for use in backup operations in response to detecting that the first target backup device has connected to a network.

2. The computer-accessible storage medium of claim 1,
wherein the program instructions are executable by a first computer system;
wherein at least one of the first target backup device or the another target backup device are coupled to the first computer system through a Storage Area Network (SAN).

3. The computer-accessible storage medium of claim 1,
wherein the program instructions are executable to perform said setting the state information for the first target backup device by storing the state information in a device state database, wherein the device state database includes respective state information for each respective target backup device of a plurality of target backup devices, wherein the respective state information for each respective target backup device indicates whether the respective target backup device is currently eligible for use in backup operations;
wherein the program instructions are executable to perform said accessing the state information for the first target backup device by accessing the device state database.

4. The computer-accessible storage medium of claim 3,
wherein the device state database stores history information indicating past activation states for the plurality of target backup devices;
wherein the program instructions are further executable to generate a report based on the history information.

5. The computer-accessible storage medium of claim 4,
wherein the report indicates how often each target backup device of the plurality of target backup devices has been inactivated.

6. The computer-accessible storage medium of claim 1,
wherein the first target backup device is a first target backup of a plurality of target backup devices;
wherein the program instructions are further executable to display an administrative graphical user interface for configuring the plurality of target backup devices;
wherein the program instructions are executable to receive the user input scheduling the future time via the graphical user interface.

7. The computer-accessible storage medium of claim 1,
wherein the backup operation is a first backup operation;
wherein the program instructions are further executable to:
store backup operation information specifying a second backup operation to be performed in the backup system, wherein the second backup operation is configured to use a second target backup device;

set state information for the second target backup device to indicate that the second target backup device is eligible for use in backup operations;

in response to determining that the state information for the second target backup device indicates that the second target backup device is eligible for use in backup operations, attempt to perform the second backup operation using the second target backup device; and log an error in response to determining that the second backup operation failed because the second target backup device was inaccessible.

8. The computer-accessible storage medium of claim 7,
wherein the program instructions are further executable to change the state information for the second target backup to indicate that the second target backup device is ineligible for use in backup operations in response to detecting that the second target backup device was inaccessible.

9. The computer-accessible storage medium of claim 8,
wherein, after said changing the state information for the second target backup device to indicate that the second target backup device is ineligible for use in backup operations, the program instructions are further executable to change the state information for the second target backup to indicate that the second target backup device is eligible for use in backup operations in response to detecting that a third backup operation was successful in using the second target backup device.

10. The computer-accessible storage medium of claim 1,
wherein the state information for the first target backup device is not stored on the first target backup device, wherein said accessing the state information for the first target backup device enables the program instructions to determine whether the first target backup device is eligible for use in backup operations without accessing the first target backup device to perform the determination.

11. A system comprising:
one or more processors; and
memory storing program instructions;
wherein the program instructions are executable by the one or more processors to:
store backup operation information specifying a backup operation to be performed to backup data to one or more of a set of target backup devices including at least a first target backup device for storing data backed up from client computers;

subsequent to storing the backup operation information, receive user input scheduling a future time for the first target backup device to become ineligible for use in backup operations;

at the scheduled time and in response to the user input, set state information for the first target backup device to indicate that the first target backup device is ineligible for use in backup operations;

at a first time after the scheduled time and before performing the backup operation, access the state information for the first target backup device to determine whether the first target backup device is eligible for use in backup operations;

in response to determining that the state information for the first target backup device indicates that the first target backup device is ineligible for use in backup operations, perform the backup operation by backing up one or more client computers to another target backup device instead of the first target backup device without logging an error reporting that the first target backup device was ineligible for use in the backup operation; and at a second time after the scheduled time and after performing the backup operation, automatically change the state information for the first target backup device to indicate that the first target backup device is eligible for use in backup operations in response to detecting that the first target backup device has connected to a network.

12. A method comprising:

storing backup operation information specifying a backup operation to be performed in a backup system, wherein the backup operation is configured to use a first target backup device for storing data backed up from client computers;

subsequent to storing the backup operation information, receiving user input scheduling a future time for the first target backup device to become ineligible for use in backup operations;

at the scheduled time and in response to the user input, setting state information for the first target backup device to indicate that the first target backup device is ineligible for use in backup operations;

at a first time after the scheduled time and before performing the backup operation, accessing the state information for the first target backup device to determine whether the first target backup device is eligible for use in backup operations;

in response to determining that the state information for the first target backup device indicates that the first target backup device is ineligible for use in backup operations, performing the backup operation by backing up one or more client computers to another target backup device instead of the first target backup device without logging an error reporting that the first target backup device was ineligible for use in the backup operation; and at a second time after the scheduled time and after performing the backup operation, automatically changing the state information for the first target backup device to indicate that the first target backup device is eligible for use in backup operations in response to detecting that the first target backup device has connected to a network.

13. The method of claim 12, wherein said setting the state information for the first target backup device comprises storing the state information in a device state database, wherein the device state database includes respective state information for each respective target backup device of a plurality of target backup devices, wherein the respective state information for each respective target backup device indicates whether the respective target backup device is currently eligible for use in backup operations;

wherein said accessing the state information for the first target backup device comprises accessing the device state database.

14. The method of claim 13, wherein the device state database stores history information indicating past activation states for the plurality of target backup devices;

wherein the method further comprises generating a report based on the history information.

15. The method of claim 14, wherein the report indicates how often each target backup device of the plurality of target backup devices has been inactivated.

16. The method of claim 12, wherein the first target backup device is a first target backup of a plurality of target backup devices;

wherein the method further comprises displaying an administrative graphical user interface for configuring the plurality of target backup devices;

wherein the user input scheduling the future time is received via the graphical user interface.

17. The method of claim 12, wherein the backup operation is a first backup operation;

wherein the method further comprises:

storing backup operation information specifying a second backup operation to be performed in the backup system, wherein the second backup operation is configured to use a second target backup device;

setting state information for the second target backup device to indicate that the second target backup device is eligible for use in backup operations;

in response to determining that the state information for the second target backup device indicates that the second target backup device is eligible for use in backup operations, attempting to perform the second backup operation using the second target backup device; and logging an error in response to determining that the second backup operation failed because the second target backup device was inaccessible.

18. The method of claim 17, further comprising:

changing the state information for the second target backup to indicate that the second target backup device is ineligible for use in backup operations in response to detecting that the second target backup device was inaccessible.

19. The method of claim 18, wherein, after said changing the state information for the second target backup device to indicate that the second target backup device is ineligible for use in backup operations, the method further comprises changing the state information for the second target backup to indicate that the second target backup device is eligible for use in backup operations in response to detecting that a third backup operation was successful in using the second target backup device.

20. The method of claim 12, wherein the state information for the first target backup device is not stored on the first target backup device, wherein said accessing the state information for the first target backup device enables a determination of whether the first target backup device is eligible for use in backup operations without accessing the first target backup device to perform the determination.

* * * * *